United States Patent [19]

Hirota

[11] Patent Number: 5,448,295
[45] Date of Patent: Sep. 5, 1995

[54] VIDEO CAMERA

[75] Inventor: Katsuaki Hirota, Kanagawa, Japan

[73] Assignee: Sony Corporation, Tokyo, Japan

[21] Appl. No.: 164,848

[22] Filed: Dec. 9, 1993

Related U.S. Application Data

[63] Continuation of Ser. No. 803,440, Dec. 6, 1991, abandoned.

[30] Foreign Application Priority Data

Dec. 27, 1990 [JP] Japan .................................. 2-414811

[51] Int. Cl.$^6$ .............................................. G02B 7/10
[52] U.S. Cl. ................................... 348/345; 354/400; 250/201.2
[58] Field of Search ............... 348/345, 341, 349, 357; 354/400; 250/208.1, 201.2

[56] References Cited

U.S. PATENT DOCUMENTS

| | | | |
|---|---|---|---|
| 4,265,528 | 5/1979 | Bestenreiner et al. | 354/195 |
| 4,669,849 | 6/1987 | Ohtsuka et al. | 354/400 |
| 4,935,765 | 6/1990 | Ishida et al. | 354/402 |
| 5,003,165 | 3/1991 | Sarfati et al. | 250/201 |
| 5,070,408 | 12/1991 | Kikuchi et al. | 358/227 |

FOREIGN PATENT DOCUMENTS

| | | | |
|---|---|---|---|
| 0394901 | 10/1990 | European Pat. Off. | G02B 7/10 |
| 2049231 | 12/1980 | United Kingdom | G05D 3/20 |
| 2095503 | 9/1982 | United Kingdom | G01S 17/08 |
| 2111791 | 7/1983 | United Kingdom | G03B 13/18 |

*Primary Examiner*—Michael T. Razavi
*Assistant Examiner*—Andrew B. Christensen
*Attorney, Agent, or Firm*—Ronald P. Kananen

[57] ABSTRACT

A video camera having an imaging device providing a video signal comprises; lens means for focusing an object leading to the imaging device, signal processor or processing outputs of the imaging device to video signals, focus detection means for detecting focus information of the object, drive means for driving the lens according to outputs of the focus detection means, and control means for controlling the lens position from first position to a predetermined position when the power is supplied.

1 Claim, 7 Drawing Sheets

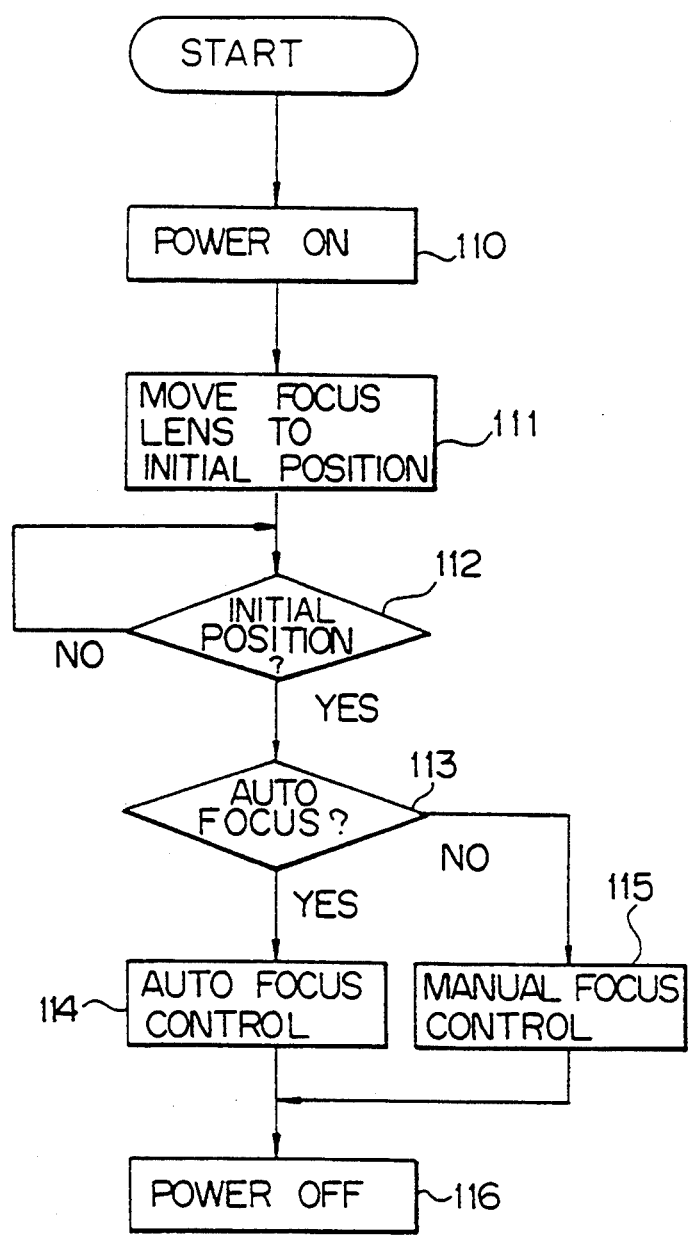

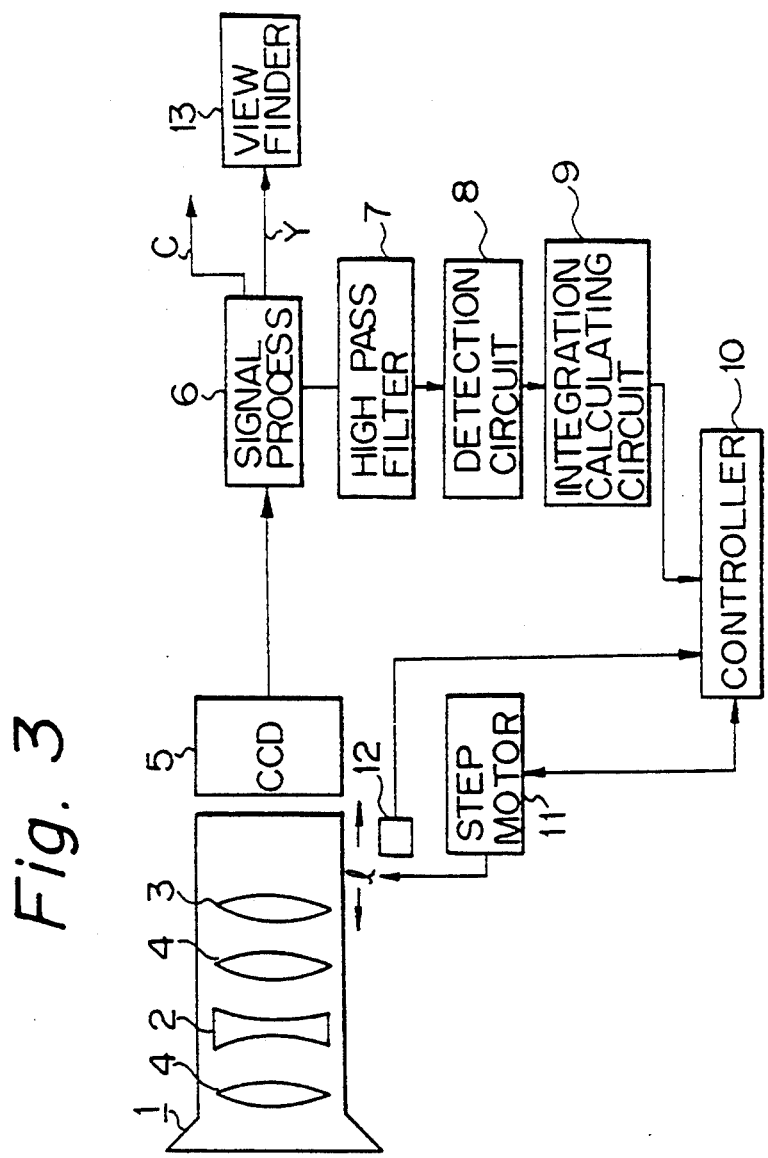

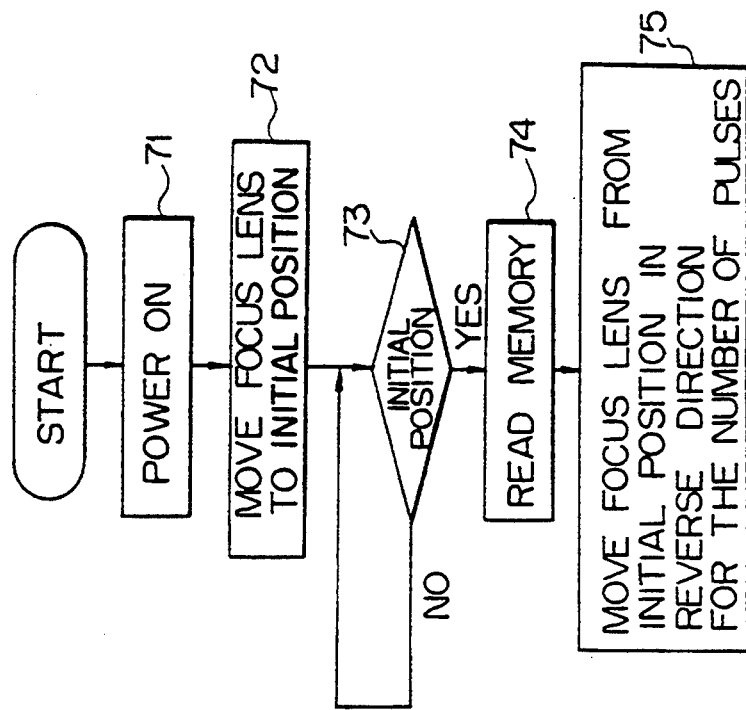

VIDEO CAMERA

This application is a continuation, of application Ser. No. 07/803,440 filed Dec. 6, 1991, now abandoned.

BACKGROUND OF THE INVENTION

1. Field of the Invention

The present invention relates to a video camera comprising an inner focus lens.

2. Description of the Prior Art

FIG. 1 is a schematic diagram showing an inner focus lens 101 and the neighboring portion thereof. The inner focus lens 101 comprises a movable zoom lens 102, a focus lens 103, and fixed lenses 104. At one end of the moving range of the focus lens 103, a lens sensor 105 is disposed. The position at which the lens sensor 105 is disposed is referred to as an initial position. The lens sensor 105 is, for example, a photo interrupter. In addition, a step motor 106 is provided for moving the focus lens 103.

In the inner focus lens 101, the step motor 106 is used to move the focus lens 103. The initial position of the focus lens 103 is detected by the lens sensor 105. The absolute position of the focus lens 103 is obtained on the basis of the initial position so as to control the position of the focus lens 103.

In this video camera using such an inner focus lens 101, when the power thereof is turned on, as an initial process, the focus lens 103 is temporarily moved from the position at which the focus lens 103 is placed when the power is turned on (this position is named a first position) to one end of the inner focus lens 101 at which the lens sensor 105 is disposed. The lens sensor 105 detects whether or not the focus lens 103 arrived at the initial position. When the lens sensor 105 detects that the focus lens 103 arrived at the initial position, the initial process is completed. Thereafter, the absolute position of the focus lens 103 is obtained on the basis of the initial position so as to control the position of the focus lens 103.

That is, the operation of the conventional video camera is shown in FIG. 2. When the power of the video camera is turned on (at the step 110), a drive signal is input to the step motor 106 and thereby the focus lens 103 is moved from the first position to the initial position (at the step 111). The lens sensor 105 detects whether or not the focus lens 103 arrived at the initial position (at the step 112). When the lens sensor 105 detected that the the focus lens 103 arrived at the initial position, a controller (not shown in the figure) detects which mode, i.e. an focus mode or a manual focus mode, has been selected (at the step 113). When the auto focus mode has been selected, the focus lens 103 is moved to an in-focus position under auto focus control (at the step 114). When the manual focus mode has been selected, the user controls the position of the focus lens 103 (at the step 115). After a picture is photographed, the power of the video camera is turned off (at the step 116).

In the video camera using the conventional inner focus lens, when the power is turned off and then turned on, after the focus lens is moved back to the initial position for the initial process and then the focus lens is moved to the in-focus position or optimum position under auto focus control or manual focus control. Thus, when the same subject is photographed, if the power is turned off, the subject becomes out of focus at the initial position and thereby it takes a long time for adjusting the focus position.

In addition, in the video camera using the conventional inner focus lens, the lens sensor 105 is disposed at one end of the moving range of the focus lens 103. Thus, for example, if the in-focus position of the subject is at the other end of the moving range of the focus lens 103, when the power is turned on, the focus lens 103 is moved to the initial position at the end of the moving range thereof. Thereafter, the focus lens 103 is gradually moved from this initial position to the in-focus position at the other end of the moving range thereof under the auto focus control or manual focus control. Thus, it takes a long time for focusing the subject.

OBJECTS AND SUMMARY OF THE INVENTION

Therefore, an object of the present invention is to provide a video camera for moving a focus lens to a nearly in-focus position when the power thereof is turned on even after the power is turned off in photographing the same subject from the same position.

Another object of the present invention is to provide a video camera which can reduce a focus control time of a focus lens after the power is turned on regardless of the position of the subject.

According to an aspect of the invention, there is provided a video camera having an imaging device providing a video signal comprising:

lens means for focusing an object leading to the imaging device;

a signal processor for processing outputs of the imaging device to video signals;

focus detection means for detecting focus information of the object;

drive means for driving the lens according to outputs of the focus detection means; and control means for controlling the lens position from a first position to a predetermined position when the power is supplied.

The above, and other, objects, features and advantage of the present invention will become readily apparent from the following detailed description thereof which is to be read in connection with the accompanying drawings.

BRIEF DESCRIPTION OF THE DRAWINGS

FIG. 2 is a flow chart describing the video camera according to prior art;

FIG. 3 is a block diagram of a first embodiment according to the present invention;

DETAILED DESCRIPTION OF THE PREFERRED EMBODIMENTS

Figure 1:
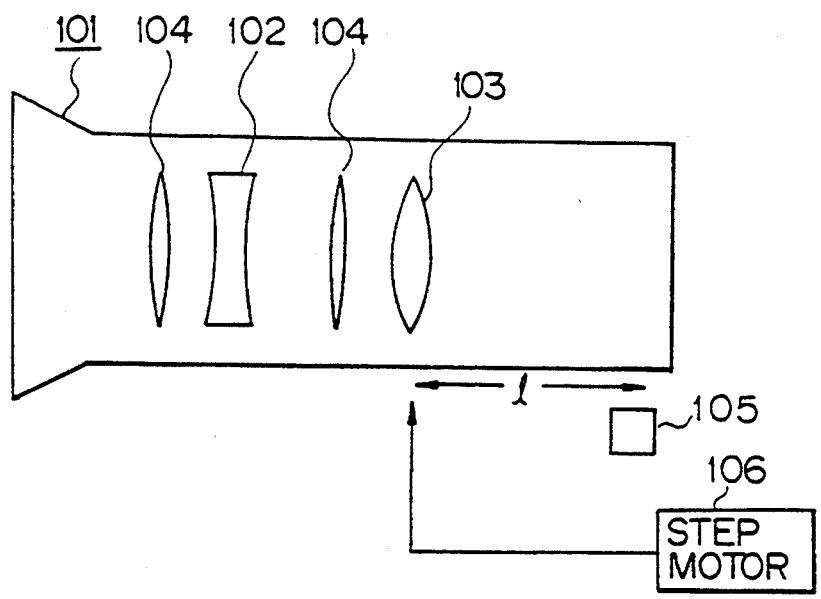
FIG. 1 is a block diagram of a video camera according to prior art.

Now, with reference to the accompanying drawings, embodiments according to the present invention will be described.

FIG. 3 is a block diagram of a first embodiment according to the present invention. An inner focus lens 1 comprises a zoom lens 2, a focus lens 3, and fixed lenses 4. The focus lens 3 is movable in a moving range l by a step motor 11. A lens sensor 12 detects whether or not the focus lens 3 arrived at an initial position when the power is turned on.

A subject image which is input through the inner focus lens 1 is focused on a CCD imaging device 5. The CCD imaging device 5 obtains an imaging signal in accordance with the subject. The imaging signal is sent to a signal process circuit 6. The signal process circuit 6 separates the imaging signal sent from the CCD imaging device 5 into a luminance signal Y and a chroma signal C. The luminance signal Y is sent to a view finder 13. With the view finder 13, the user can monitor the image.

The luminance signal Y from the signal process circuit 6 is sent to a high pass filter 7. The high pass filter 7 extracts a high band component of the luminance signal Y. The high band component is detected by a detection circuit 8 and then sent to an integration calculating circuit 9. The integration calculating circuit 9 integrates the high band component in the luminance signal Y over a particular focus area so as to obtain an evaluation value. The output of the integration calculating circuit 9 is sent to a controller 10.

The controller 10 sends a drive signal to a step motor 11 in accordance with the output from the integration calculating circuit 9. In accordance with the drive signal, the step motor 11 is rotated so as to control the movement of the focus lens 3 to an in-focus position. In other words, at the in-focus position, the high band component of the luminance signal Y maximizes. Thus, the movement of the focus lens 3 is controlled so that the evaluation value obtained from the integration calculating circuit 9 becomes a maximum.

Figure 4:
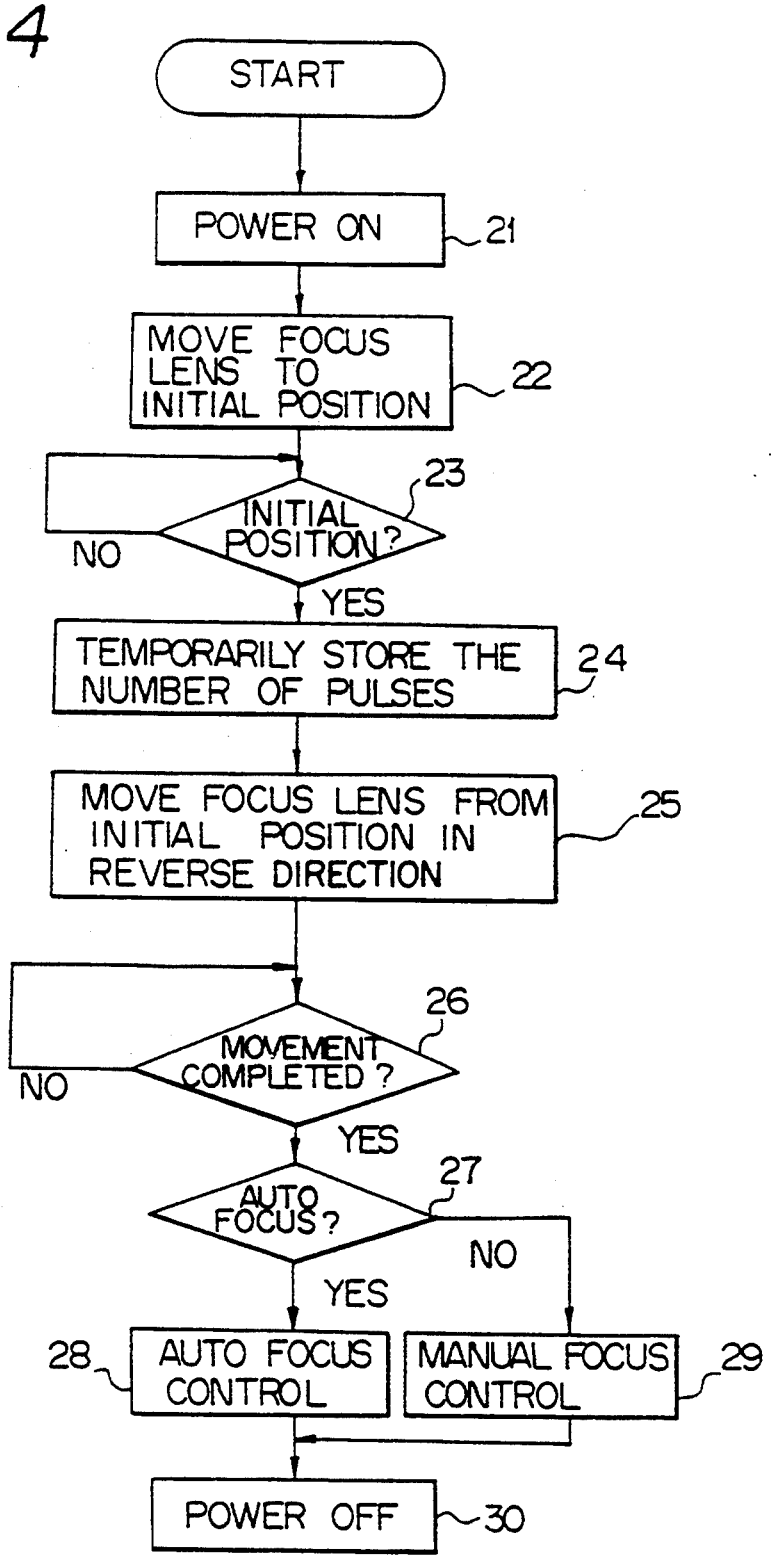
FIG. 4 is a flow chart describing the first embodiment according to the present invention.

FIG. 4 is a flow chart showing the operation of the first embodiment according to the present invention. When the power is turned on (at the step 21), the focus lens 3 is moved to the initial position (at the step 22). The lens sensor 12 detects whether or not the focus lens 3 arrived at the initial position (at the step 23). Until the focus lens arrives at the initial position, the lens sensor 12 continuously detects the position of the focus lens 3. At the steps 22 and 23, the controller 10 counts the number of pulses necessary for moving the focus lens 3 from the first position to the initial position. When the lens sensor 12 detects that the focus lens 3 arrived at the initial position, the number of pulses is temporarily stored (at the step 24). Thereafter, the focus lens 3 is moved from the initial position for the number of pulses being stored (at the step 25). Thereafter, it is detected whether or not the focus lens 3 has been moved backed by the recorded number of pulses (at the step 26). When the movement of the focus lens 3 is completed, the controller 10 detects which mode, i.e. an auto focus mode or a manual focus mode has been selected (at the step 27). When the auto focus mode has been selected, the focus lens 3 is moved to the in-focus position under the auto focus control (at the step 28). When the manual focus mode has been selected, the user controls the position of the focus lens 3 (at the step 29). After the subject is photographed, the power is turned off (at the step 20).

In FIG. 4, the controller 10 stores the number of pulses necessary for the focus lens 3 to move from the first position to the initial position at the steps 22 and 23. This distance, that is the number of pulses, is input to the step motor 11 and thereby the focus lens 3 is immediately moved to the first position 1. Now the initial process is completed. Thus, when the power is turned on, the focus lens 3 is moved nearly to the in-focus position and thereby the focusing time becomes short.

Figure 5:
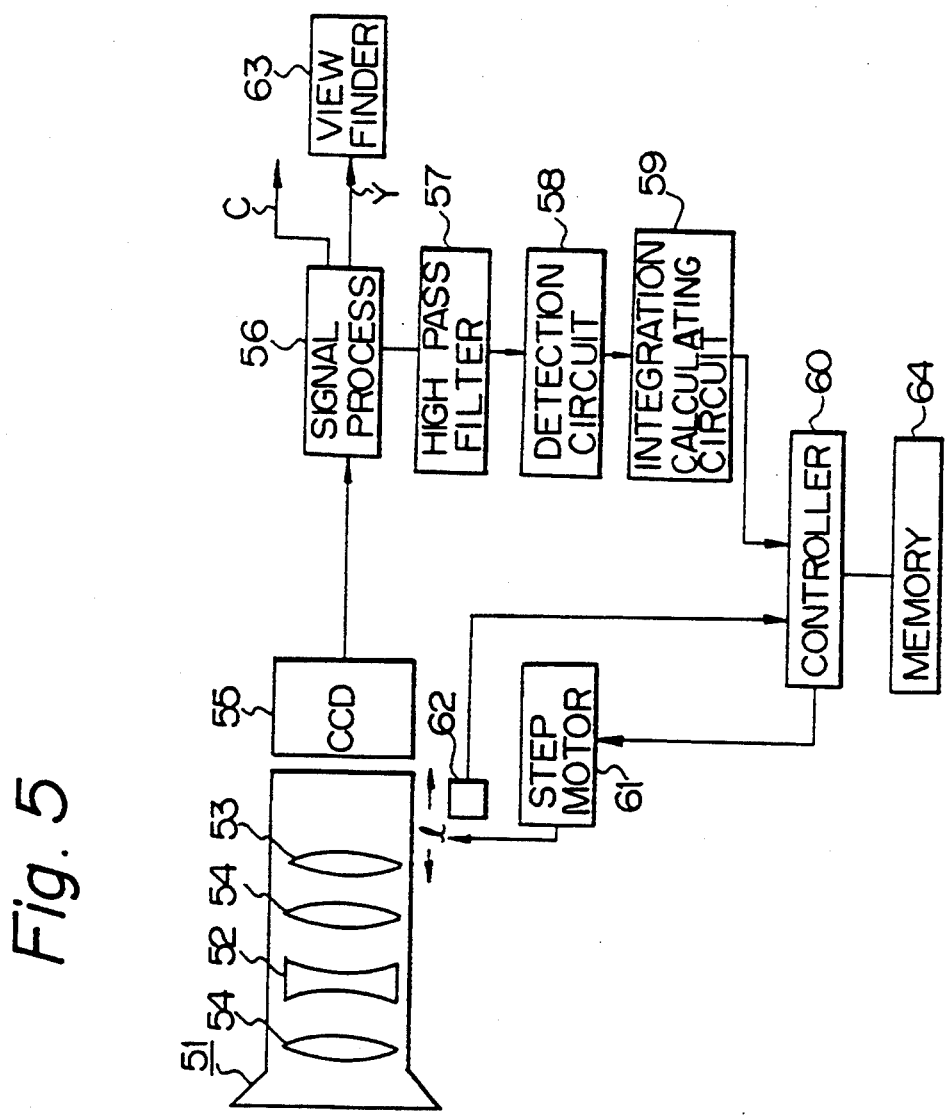
FIG. 5 is a block diagram of a second embodiment according to the present invention.

FIG. 5 is a block diagram of another embodiment according to the present invention. An inner focus lens 51 comprises a zoom lens 52, a focus lens 53, and fixed lenses 54. The focus lens 53 is movable in a moving range l by a step motor 61. A lens sensor 62 detects whether or not the focus lens 53 arrived at the initial position when the power is turned on.

A subject image which is input through the inner focus lens 51 is focused on a CCD imaging device 55. The CCD imaging device 55 obtains an imaging signal in accordance with the subject. The imaging signal is sent to a signal process circuit 56. The signal process circuit 56 separates the imaging signal sent from the CCD imaging device 55 into a luminance signal Y and a chroma signal C. The luminance signal Y is sent to a view finder 63. With the view finder 63, the user can monitor the image.

The luminance signal Y from the signal process circuit 56 is sent to a high pass filter 57. The high pass filter 57 extracts a high band component of the luminance signal Y. The high band component is detected by a detection circuit 58 and then sent to an integration calculating circuit 59. The integration calculating circuit 59 integrates the high band component in the luminance signal Y over a particular focus area so as to obtain an evaluation value. The output of the integration calculating circuit 59 is sent to a controller 60.

The controller 60 sends to a step motor 61 a drive signal in accordance with the output from the integration calculating circuit 59. In accordance with the drive signal, the step motor 61 is rotated so as to control the movement of the focus lens 53 to an in-focus position. In other words, at the in-focus position, the high band component of the luminance signal Y becomes maximum. Thus, the movement of the focus lens 53 is controlled so that the evaluation value obtained from the integration calculating circuit 59 becomes maximum. In this embodiment, a pulse storage memory 64 for storing the number of pulses for the step motor 61 to move from the initial position to the first position is provided. The pulse storage memory 64 is, for example, a non-volatile memory such as an EPROM.

Figure 6B:
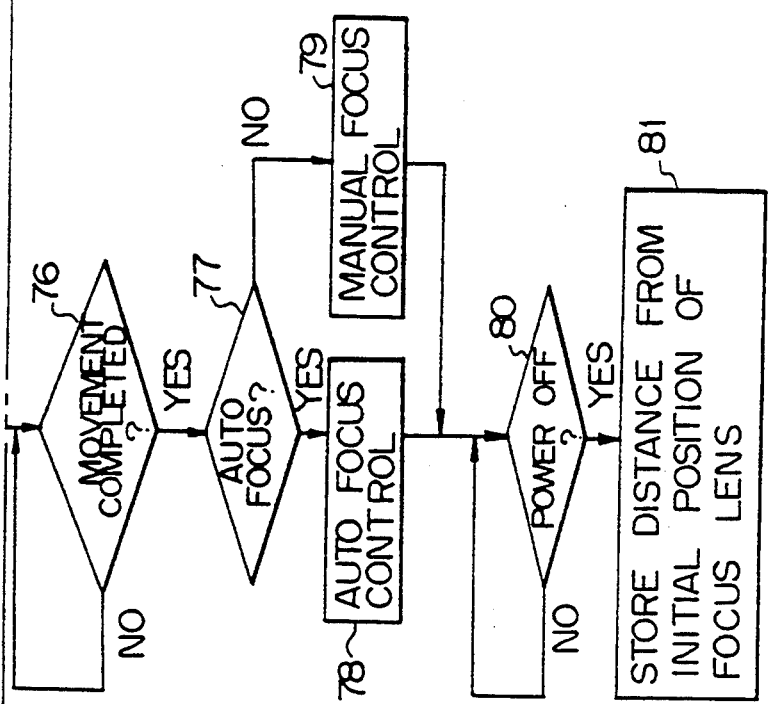
FIG. 6 is a flow chart describing the second embodiment according to the present invention.

FIG. 6 is a flow chart showing the operation of the other embodiment according to the present invention. When the power is turned on (at the step 71), the focus lens 53 is moved from the first position to the initial position (at the step 72). The lens sensor 62 detects whether or not the focus lens 53 arrived at the initial position (at the step 73). When the lens sensor 62 detects that the focus lens 53 arrived at the initial position, the number of pulses from the initial position to the first position stored in the pulse storage memory 64 are read (at the step 74). In accordance with the number of pulses, the focus lens 53 is moved from the initial position toward the first position (at the step 75). When the movement of the focus lens 53 is completed (at the step 76), the initial process is completed. Thereafter, it is detected which mode, i.e. an auto focus mode or a manual focus mode has been selected (at the step 77). When the auto focus mode has been selected, the auto focus lens 53 is moved to the in-focus position under the auto focus control (at the step 78). When the manual focus mode has been selected, the user controls the position of the focus lens 53 (at the step 79). After the subject is photographed, when the power is turned off (at the step 80), the pulse storage memory 64 stores the number of pulses from the initial position to the first position (at the step 81).

In FIG. 6, when the power is turned off, the pulse storage memory 64 stores the number of pulses necessary for moving the focus lens 53 from the initial position to the first position. When the power is turned on, as the initial process, the focus lens 53 is moved from the initial position to the first position for the distance in accordance with the number of pulses. Thus, when the power is turned on, the focus lens 53 is moved nearly to the in-focus position and thereby the focusing time becomes short.

Figure 7:
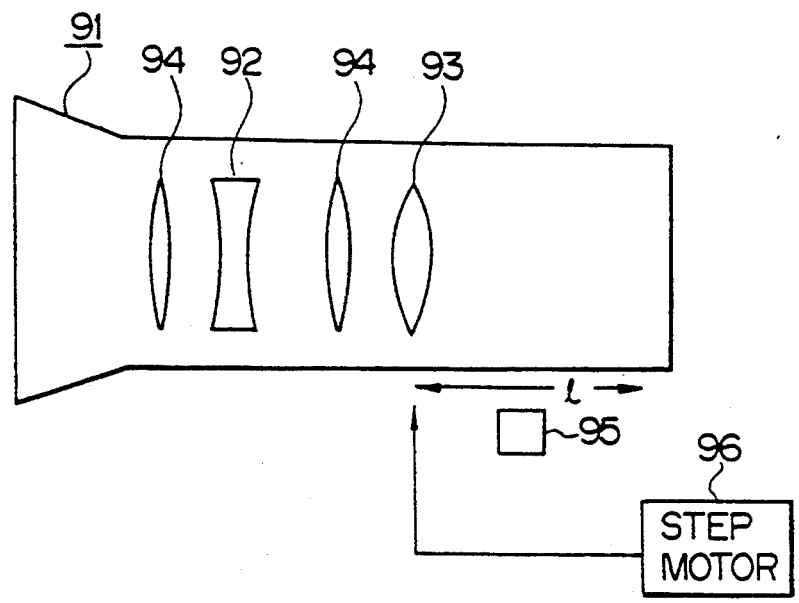
FIG. 7 is a block diagram describing a modification according to the present invention.

FIG. 7 is a schematic diagram showing a modification of the above mentioned embodiments. In the figure, an inner focus lens 91 comprises a zoom lens 92, a focus lens 93, and fixed lenses 94. The focus lens 93 is movable in a moving range l by a step motor 96. In addition, a lens sensor 95 is disposed nearly at center of the moving range of the focus lens 93. The position of the focus lens 93 in accordance with the lens sensor 95 is named an initial position.

When the lens sensor 95 is placed at one end of the moving range of the focus lens 93 and the in-focus position is set at the other end thereof, the focus lens 93 is moved to the initial position as the initial process. Thus, the focus lens 93 should be moved from one end of the moving range l to the other end thereof. In this modification, the lens sensor 95 is disposed nearly at a center of the moving range of the focus lens 93. Thus, even if the focus lens 93 is located at the other end of the moving range, the moving distance of the focus lens 93 necessary for the initial process is reduced to about half of that in the conventional method. In addition, regardless of the position of the moving range, the focus lens is located in, it is not necessary to move the focus lens 93 for a long distance in the initial process.

In the above embodiments, the lens sensors 12, 62, 95 are not limited to photo interrupters, but may be any device which can detect the position of the respective focus lenses 3, 53, 93.

As was described above, according to the video camera according to the present invention, when the same subject is photographed at the same distance, the focus lens is moved to the initial position and then to the former position as the initial process. Thus, when the power is turned on, the subject can be immediately focused. In other words, an out-of-focus condition due to power on-off cycles can be prevented.

In addition, according to the video camera according to the present invention, since the lens sensor is disposed nearly at a center of the moving range of the focus lens, regardless the position in the moving range at which the focus lens is placed, it does not take a long time for the initial process. Even if the worst case according to the prior art is compared with that according to the present invention, the moving time of the focus lens for the initial process can become half the former. In other words, according to the present invention, the amount of time necessary after the power-on state until the in-focus state can be reduced in comparison with the prior art. In addition, even while the video camera is operating, the initial position can be detected and thereby mis-counting of steps due to malfunction of the step motor can be prevented.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video camera, comprising:

an imaging device receiving information indicative of an object and providing an image signal output representative thereof;

lens means including several lens groups for focusing said object leading to said imaging device, at least one of said lens groups having at least one movable focus lens which is movable along a range of positions including an initial position and a first position which are located in said range of positions;

sensor means located relative to said lens means for detecting a position of said movable focus lens when said lens is moved, said sensor means including lens detecting means located at about a midpoint of said range, said lens detecting means being arranged to determine when said movable focus lens arrives at said initial position at the midpoint of said range;

a signal processor for processing said image signal output of said imaging device to provide a video signal output representative thereof, said video signal output having luminance and chrominance components;

separator means for separating said luminance and chrominance components from said video signal;

focus detection means for detecting the level of said luminance signal to provide an in-focus position signal representative of an in-focus position for said focus lens;

a step motor for driving said movable focus lens according to said in-focus position signal of said focus detection means; and control means responsive to said in-focus position signal for controlling movement of said movable focus lens from said first position in said range to said initial position, when power is supplied to said camera, said control means counting the number of step motor pulses necessary to move said movable focus lens from said first position to said initial position, said number of pulses being used to control movement of said focus lens from said initial position back to said first position; further comprising memory means for storing an output from said focus detection means in a manner wherein the number of pulses which occur as the movable focus lens moves from said first position to said initial position are stored in said memory.

* * * * *